United States Patent [19]

Hehl

[11] Patent Number: 4,823,551

[45] Date of Patent: Apr. 25, 1989

[54] HYDRAULIC CONTROL CIRCUIT FOR AN INJECTION MOLDING WITH TWO LOADS DRIVEN BY A PUMP

[76] Inventor: Karl Hehl, Arthur-Hehl-Strasse 32, 7298 Lossburg 1, Fed. Rep. of Germany

[21] Appl. No.: 814,634

[22] Filed: Dec. 30, 1985

[30] Foreign Application Priority Data

Dec. 28, 1984 [DE] Fed. Rep. of Germany ....... 3447709

[51] Int. Cl.⁴ ............................................. F15B 13/06
[52] U.S. Cl. ...................................... 60/422; 60/368; 60/423; 60/445
[58] Field of Search ................. 60/368, 422, 423, 390, 60/391, 445, 459

[56] References Cited

U.S. PATENT DOCUMENTS

| | | | |
|---|---|---|---|
| 3,589,130 | 6/1971 | Flarchar | 60/423 X |
| 4,017,215 | 4/1977 | Butter | 60/423 X |
| 4,463,558 | 8/1984 | Miller et al. | 60/422 |
| 4,617,854 | 10/1986 | Krepp | 60/422 X |
| 4,635,440 | 1/1987 | Kropp | 60/422 |

FOREIGN PATENT DOCUMENTS 2099610 12/1982 United Kingdom.

Primary Examiner—A. Michael Chambers
Assistant Examiner—John C. Fox
Attorney, Agent, or Firm—Joseph A. Geiger

[57] ABSTRACT

A hydraulic control system for simultaneously driving two hydraulic loads of a production machine by means of a variable delivery pump feeding drive fluid to the two loads through separate load lines, in accordance with independently controllable programs of flow rate and pressure, the two load lines being controlled by two proportional P/Q valves, the pump being continuously adjusted for a constant pressure gradient in the load line which carries the higher pressure, the other load line having a pressure imbalance compensating device in the form of either a flow rate measuring device, a pressure balancing valve, or a displacement-to-voltage converter connected to the associated load.

7 Claims, 2 Drawing Sheets

HYDRAULIC CONTROL CIRCUIT FOR AN INJECTION MOLDING WITH TWO LOADS DRIVEN BY A PUMP

BACKGROUND OF THE INVENTION

1. Field of the Invention

The present invention relates to hydraulic drive controls for production machines and, more particularly to a hydraulic control circuit which makes it possible to drive two loads in an injection molding machine, for example, by means of a hydraulic pump, in accordance with separate flow rate programs and pressure programs for the two load lines supplying drive fluid to the two loads.

2. Description of the Prior Art

One of the primary objectives in the design of hydraulic drive systems is the maximization of the hydraulic efficiency of the drive system, i.e. the goal of avoiding, as much as possible, the conversion of hydraulic drive energy into heat in connection with the use of fluid throttling devices.

It has therefore already been suggested to drive a hydraulic load—typically a cylinder assembly or a hydraulic motor—at changing speeds and force or torque, with the aid of a variable-delivery pump, preferably a pilot-operated variable-delivery pump. In such a hydraulic control circuit, the output setting of the variable delivery pump is continuously adjusted by means of a pump adjusting valve in a feedback loop, the pump adjusting valve controlling the pump output so as to maintain a small constant operational pressure gradient for a flow control valve in the load line, thereby minimizing the throttling action of the flow control valve.

The use of a computer for the storage and generation of control input data, with its advantages of simplicity and unlimited adaptability to changing operational requirements through digitization and storage of the control information, has brought with it a need for hydraulic control valves which are capable of translating continuously changing electronic input signals into correspondingly changing hydraulic values of flow rate and pressure in a load line.

Best suited for this purpose are electromagnetically driven valves of the type which are known as proportional-response valves. A valve of this type has its valve spool connected to a special proportional-response solenoid of which the armature moves to, and is retained in, an axial position which is proportional to the value of the input signal being fed to the control circuit of the proportional-response solenoid.

Included among the known proportional-response valves are proportional flow control valves, proportional pressure control valves and the more recently proposed proportional pressure and flow control valves, or so-called proportional P/Q valves. A proportional P/Q valve is capable of controlling either the flow (quantity "Q") or the pressure ("P") in a load line, depending on whether speed or force is the governing parameter of the hydraulic control program.

In connection with the hydraulic drive system of an injection molding machine, it has already been suggested to use, as part of an energy-efficient hydraulic control system, a pilot-controlled variable-delivery pump which has arranged in its load line a proportional P/Q valve and a pressure transducer. By means of the proportional P/Q valve, either the flow rate or the pressure in the load line is continuously adjusted in accordance with either a flow program determining the speed of the load, or a pressure program determining the force which is applied to the load.

Through a feedback line which links the downstream side of the proportional P/Q valve to the pump adjusting valve of the variable-delivery pump of the hydraulic system, the pump output is continuously adjusted to maintain an output pressure which exceeds the drive pressure in the load line by the operational pressure gradient. Such a hydraulic control system is disclosed in the German Pat. No. 31 19 095 and in the corresponding Canadian Pat. No. 1,171,757.

This known hydraulic control circuit has the shortcoming that it is not suitable for the simultaneous driving of two loads in a production machine in accordance with separate speed and force programs.

SUMMARY OF THE INVENTION

Underlying the present invention is the primary objective of suggesting an improved hydraulic control system which offers the capability of supplying two hydraulic loads of a production machine through two separate load lines which are branches of the main supply line of a variable-delivery pump, while the latter is being operated at an energy-efficient low operational pressure gradient.

The present invention proposes to attain this objective by suggesting a hydraulic control system in which a variable delivery pump feeds drive fluid to a main supply line which branches into two load lines for the two hydraulic loads of the production machine, and where each load line has flow-controlling valve means and pressure-controlling valve means, preferable in the form of a proportional P/Q valve, for the continuous adjustment of the flow rate and pressure, respectively, in accordance with separate flow rate and pressure programs supplied by a program generating means, preferably a control computer.

The pump adjusting valve of the variable delivery pump receives its control input through a pressure feedback line with two feedback branches linking the pump adjusting valve to both load lines downstream of the proportional P/Q valves in such a way that the variable delivery pump establishes the pressure gradient with reference to the major load line, i.e. the load line which momentarily carries a higher pressure, while the minor load line, i.e. the line which momentarily carries a lower pressure, is temporarily shut off from its feedback branch by means of a flip-flop check valve.

For the purpose of controlling the pressure in the two load lines under a pressure program, each line has a pressure transducer in a feedback circuit.

The control of the flow rate by the proportional P/Q valve under a flow rate program requires a constant pressure gradient on the valve. Therefore, this kind of flow rate control is possible only in the major load line.

For the purpose of controlling the flow rate in the minor load line, the proposed hydraulic circuit features, for each of the two load lines, a device for the compensation of the pressure imbalance between the two load lines, the compensating device operating normally only in the minor load line.

The present invention proposes three different pressure imbalance compensating devices: a flow rate measuring device downstream of the proportional P/Q valve, or a pressure balancing valve upstream of the proportional P/Q valve, or a displacement-to-voltage converter connected to each load.

A flow rate measuring device in the minor load line overrides the adjustment position transducer of the proportional P/Q valve, as the adjustment position transducer requires a constant pressure gradient for proper operation. A flow rate measuring device of a higher price class offers a very accurate flow control performance.

A pressure balancing valve in the minor load line functions as a pressure-reducing valve which operates to establish the same constant pressure gradient for the proportional P/Q valve in the minor load line as is being established by the pump adjusting valve in the major load line. In comparison with the flow rate measuring device, the pressure balancing valve is less costly and has fewer parts that are subject to wear.

A displacement-to-voltage converter is comparable in its operation to that of the flow rate measuring device, inasmuch as its feedback signal overrides the adjustment position transducer of the proportional P/Q valve in the minor load line. A displacement-to-voltage converter involves a higher level of cost and mechanical complexity, offering, in return, the highest accuracy of control performance.

Depending upon the specific drive requirements of the hydraulic loads of the machine under consideration, it may be advantageous to use a particular one of the three compensating devices in one load line and another one in the other load line. Under certain circumstances, it may also be advisable to use one or two displacement-to-voltage converters in addition to the built-in imbalance compensating devices. Such a possibility is indicated by dotted lines in FIG. 1 and in FIG. 2.

In an injection molding machine, the novel hydraulic control system of the invention is particularly suited for the program-controlled control of the following operations within an injection molding cycle: Opening of the injection molding die and ejection of the molded part, or parts, from the die; Opening of the injection molding die and removal of a core by means of a core removing device; Removal of two cores by means of two separate core removing devices; Pre-plastification of the plastic raw material in the plastification cylinder through rotation of the plastification screw, as the latter is being pushed backwards against controlled pressure, and closing or opening of the injection molding die.

BRIEF DESCRIPTION OF THE DRAWING

Further special features and advantages of the invention will become apparent from the description following below, when taken together with the accompanying drawing which illustrates, by way of example, a preferred embodiment of the invention which is represented in the various figures as follows.

DESCRIPTION OF THE PREFERRED EMBODIMENT

Figure 1:
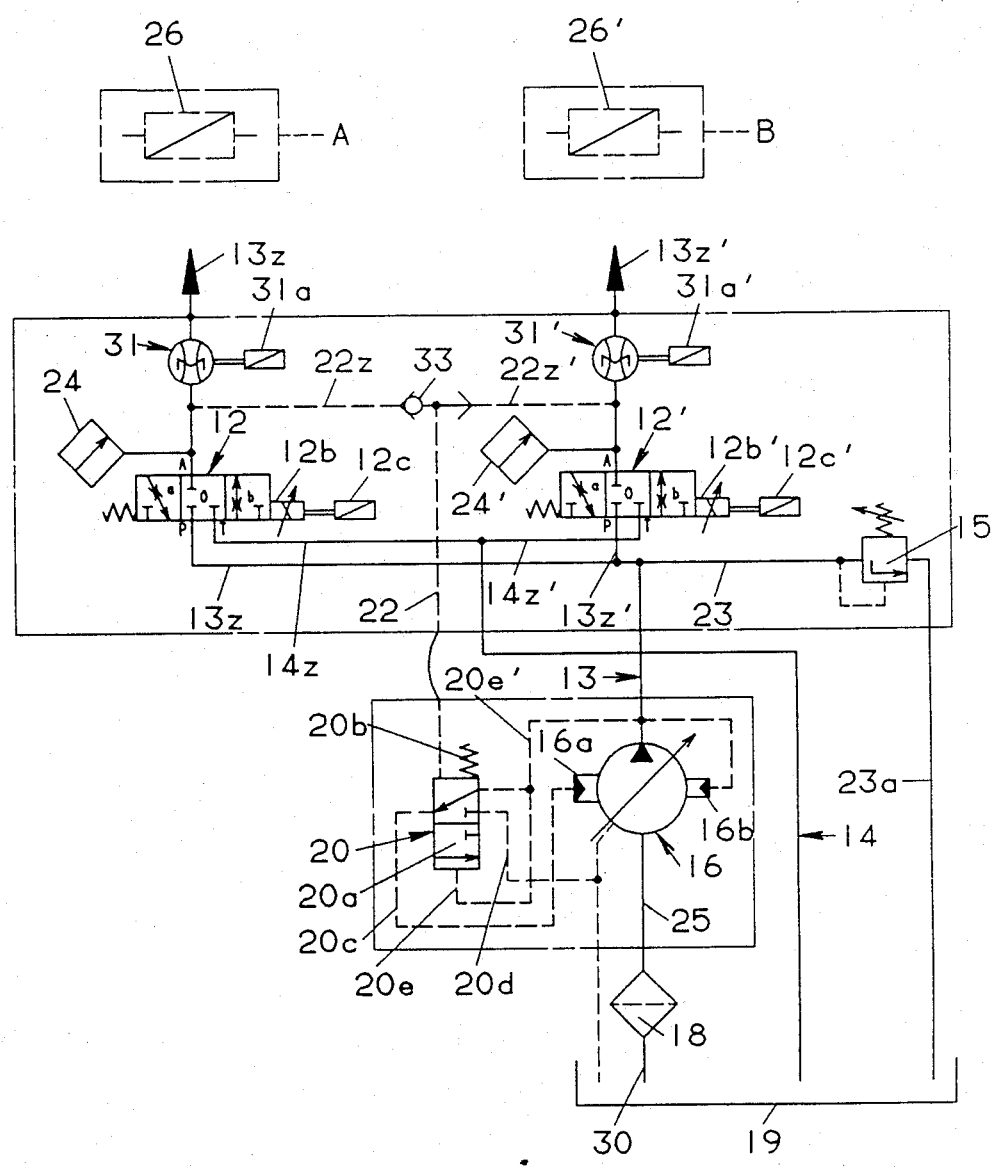
FIG. 1 shows, in the form of a hydraulic control diagram, a hydraulic control system embodying the invention in which a pump supplies pressure to two separate load lines, each of the two load line having a flow rate measuring device for controlling the flow rate of the minor load line.

The basic concept of the present invention is a novel hydraulic control system in which a variable-delivery pump 16 with a pilot-controlled pump adjusting valve 20 is used to drive two separate hydraulic assemblies or loads A and B of a production machine, more particularly, of an injection molding machine, in accordance with a specific program of variable speed and force values which are fed to the hydraulic control circuit from the control computer of the injection molding machine.

For this purpose, the main supply line 13 of the variable-delivery pump 16 branches into two load lines 13z and 13z' for the loads A and B, respectively, either the pressure or the flow in the load lines 13z and 13z' being controllable by means of two proportional pressure/flow control valves P/Q valves for short—which are numbered 12 and 12', respectively.

The two load lines 13z and 13z' are monitored by pressure transducers 24 and 24', respectively, which serve as a pressure feedback source, when the associated proportional P/Q valve 12 or 12' is operated in accordance with a pressure control program.

Under normal operating conditions, the pressure required in the two load lines 13z and 13z' is higher in one load line than in the other. In the following, the load line with the higher pressure will be referred to as the major load line, and the load line with the lower pressure will be referred to as the minor load line. A changeover of the two load lines 13z and 13z' from the role of major load line to that of minor load line may take place at any time during operation of the hydraulic system, in accordance with the drive programs which have been established for the two loads.

The pump adjusting valve 20 receives its pilot pressure from the major load line 13z or 13z', tapping said line at a point downstream of the proportional P/Q valve 12 or 12', respectively, by means of a feedback branch 22z or 22z', respectively. A flip-flop-check valve 33 controls the junction branches between the feedback branches 2z and 22z' and a pressure feedback line 22 leading to the pump adjusting valve 20. The flip-flop valve 33 assures that only the major load line is connected to the pump adjusting valve 20.

The pump adjusting valve, described in more detail further below, serves to continuously adjust the output of the variable-delivery pump 16 for an output pressure which establishes a minimal operational pressure gradient between the main supply 13 and the major load line 13z or 13z', downstream of its proportional P/Q valve 12 or 12', respectively. A preferred operational pressure gradient is a pressure drop in the order of 11 bar.

In the drawing, the three hydraulic circuit diagrams represent drive conditions, under which the load B requires a higher hydraulic pressure than the load A. This means that the load line 13z' is temporarily the major load line and connected to the pump adjusting valve 20 via the feedback branch 22z' and the pressure feedback line 22. The load line 13z of load A is temporarily the minor load line.

At the point where the main supply line 13 branches into the two load lines 13z and 13z', both load lines receive the same pressure, as determined by the pump adjusting valve 20, in conformance with the pressure requirements in the major load line 13z'. Because the pressure supplied to the branching point of the minor load line 13z is higher than the pressure required in that line, the hydraulic system of the invention suggests the arrangement in each of the two load lines 13z and 13z' of a means for compensating the pressure imbalance in the minor load line by reducing the pump output pressure to the lower pressure level required for the minor load (load A in the drawing).

The three figures in the drawing show three different means for compensating the pressure imbalance in the minor load line: In FIG. 1, the two load lines 13z and 13z' are equipped with a flow rate measuring device 31 and 31', respectively; in FIG. 2, the two load lines 13z and 13z' have pressure balancing valves 32 and 32', respectively, arranged ahead of their proportional P/Q valves 12 and 12'; and, in FIG. 3, the load lines 13z and 13z' are controllable by means of two displacement-to-voltage converters 26 and 26' which are associated with the loads A and B, respectively, of the injection molding machine.

It should be understood that it is also possible to combine any two of these pressure imbalance compensating means in a single hydraulic system. The operation of the three different compensating means is described in more detail further below.

In the special case in which the minor load A is not being driven, i.e., requiring neither movement nor the application of a holding force, the minor load line 13z has zero pressure and its proportional P/Q valve 12 is closed. In this case, the means for compensating the pressure imbalance in the minor load line is likewise inoperative.

In this operating mode, the hydraulic control system of the invention operates in the same manner as the hydraulic control system which is disclosed in the earlier-mentioned German Pat. No. 31 19 095, wherein the variable-delivery pump supplies pressure to a single load line with a proportional P/Q valve and a pressure transducer, and wherein, in the pressure control mode of the system, the setting of the proportional P/Q valve is verified against the pressure transducer, and, in the flow control mode of the system, the setting of the proportional P/Q valve is verified against either the adjustment position transducer of the P/Q valve or a displacement-to-voltage converter sensing the actual position of the load.

It should be understood that, while the operation of the control system is being described with the load line 13z' of load B serving as the major load line, as shown in the drawing, the same conditions apply, when the load line 13z of the load A serves as the major load line.

The continuous adjustment of the variable delivery pump 16 by means of the pump adjusting valve 20 for a constant pressure gradient in relation to the pressure in the major load line 13z' takes place in a known manner:

The output of the variable delivery pump 16 is determined by the relative positions of a large pump control piston 16a and a small pump control piston 16b opposing each other, an advance of the large pump control piston 16a in the direction toward the small pump control piston 16b increasing the pump output.

The preload of the adjustable spring 20b of the pump adjusting valve 20 determines a constant operational pressure gradient, the latter being the difference between the pressure in the load line 13z' behind the proportional P/Q valve 12' and the main supply line 13. The pressure in the load line 13z' is fed to the pump adjusting valve 20 through the feedback branch 22z' and the pressure feedback line 22, the pressure in the main supply line 13 is fed to the pump adjusting valve 20 via the control lines 20e and 20e'.

When the pressure differential between the main supply line 13 and the load line 13z' increases above the operational pressure gradient, the spool of the valve 20 shifts against the spring 20b, thereby closing the communication between the control line 20e' and the control line 20c leading to the large pump control piston 16a, while opening the control line 20c to the drain line 20d. The result is a relaxation of the pressure against the large pump control piston 16a and an advance of the small pump control piston 16b which produces a correspondingly reduced pump output and a lowering of the output pressure in the main supply line 13, until the operational pressure gradient is reestablished.

When the pressure differential between the main supply line 13 and the load line 13z' decreases below the operational pressure gradient, the spring 20b shifts the spool in the direction in which it opens the communication between the control line 20e' and the control line 20c of the large pump control piston 16a. The result is an increase in the pressure against the large pump control piston 16a, which shifts to increase the eccentricity of the pump configuration and to correspondingly increase the pump output, until the operational pressure gradient is reestablished.

The continuous adjustment of the pump output to the energy requirements of the load assures the maintenance of an optimal efficiency of the hydraulic drive system, its energy loss being limited to the pressure gradient times the flow rate.

Under operation of the hydraulic drive in accordance with a speed program for the load B, the proportional P/Q valve 12' acts as a flow controlling valve, receiving valve setting data from the control computer, which data are continuously verified against the signals obtained from the adjustment position transducer 12c' of the proportional P/Q valve 12'. The pump adjusting valve 20' adjusts the output of the variable delivery pump 16 to the pressure level which is necessary to overcome the resistance produced by the load B at the programmed speed of movement.

When the resistance of the load B increases to a point where the pressure produced in the load line 13z' corresponds to a predetermined pressure limit value, the controlling parameter for the proportional P/Q valve 12 becomes the pressure program which is simultaneously fed to the valve from the control computer. As the operation of the proportional P/Q valve 12' switches from the flow control program to the pressure control program, the valve setting is no longer verified against the adjustment values obtained from the adjustment position transducer 12c', but against the pressure signals obtained from the pressure transducer 24'.

Under the pressure control program, the required flow rate in the load line 13z' is less than under the flow control program. The output of the variable delivery pump 16 is automatically reduced by the pump adjusting valve 20, so that the pump 16 produces no more than the programmed load line pressure, augmented by the operational pressure gradient.

In the event of a sudden pressure buildup in the load line 13z' which is not called for by the pressure program, the control computer is programmed to limit the pressure surge by reacting to the signal change received from the pressure transducer 24' with a command to the proportional P/Q valve 12' to momentarily shift the valve spool to a position in which the load line 13z' is open to the return line 14, via the return line branch 14z', thereby allowing the pressure surge to dissipate by draining some of the pressure fluid to the fluid reservoir 19.

Examples of the manner in which several hydraulic loads in an injection molding machine are driven and controlled in succession by means of such a hydraulic control system are given in the earlier-mentioned German Pat. No. 31 19 095.

Examples of separate hydraulic loads in an injection molding machine which can be driven simultaneously with the hydraulic control system of the present invention are mentioned in the introductory portion of this disclosure.

When both loads are driven simultaneously, the programmed pressure in the major load line—e.g. load line 13z' as shown in the drawing—exceeds the programmed pressure in the minor load line 13z by a certain value, referred to the following as the pressure imbalance. Regardless of the size of the pressure imbalance, the variable delivery pump 16 is always controlled by the pump adjusting valve 20 in accordance with the programmed pressure in the major load line 13z'.

Since the pump adjustment parameter is the major load line pressure in both the flow program mode and the pressure program mode, the variable delivery pump 16 is automatically adjusted to deliver the sum of the two flow volumes for the load lines 13z and 13z', at the pressure required in the major load line 13z'. Accordingly, the flow rate in the minor load line 13z may be higher than the flow rate in the major load line 13z' and, under pressure control, any one or both of the two flow rates may be zero.

When the minor load line 13z is controlled under a pressure program, the control computer closes the proportional P/Q valve 12 until the lower pressure is achieved, feedback verification being made with the aid of the pressure transducer 24 of the minor load line 13z.

Under a flow rate program for the minor load A, the proportional P/Q valve 12 of the minor load line 13z can no longer be controlled by its own adjustment position transducer 12c, under direct input from the computer, as is the case with the proportional P/Q valve 12' in the major load line 13z', because the pressure gradient between the main supply line 13 and the minor load line 13z is no longer a constant one.

Figure 2:
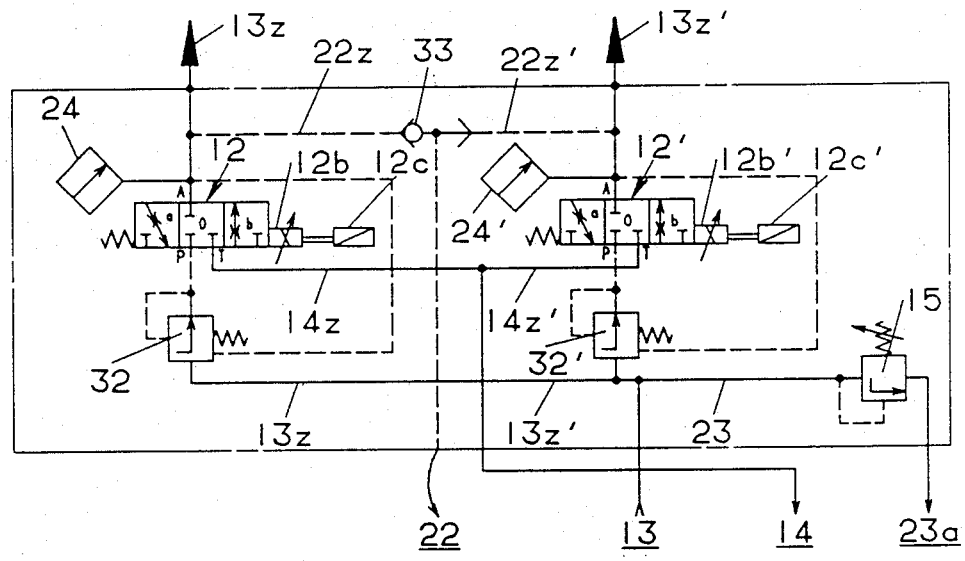
FIG. 2 shows, in a second hydraulic control diagram, a modification of the hydraulic control system of FIG. 1 in which each of the two load lines has a pressure-balancing valve for controlling the flow rate in the minor load line, the pump group being not shown.
Figure 3:
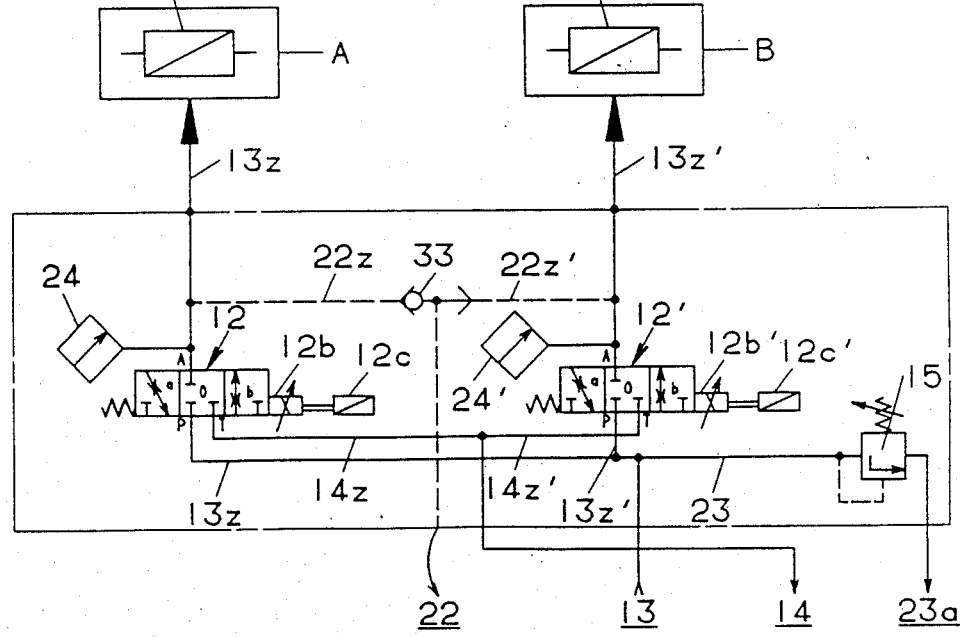
FIG. 3 (shows, in a third hydraulic control diagram, another modification of the hydraulic control system of FIG. 1 with displacement-to-voltage converters associated with the two loads capable of controlling the flow rate in the minor load line, the pump group being not shown.

The present invention therefore proposes the use of an additional means for compensating the pressure imbalance in the minor load line 13z, the pressure compensating means taking the form of one of three different devices: a flow rate measuring device 31 in the load line, as shown in FIG. 1; a pressure balancing valve 32, as shown in FIG. 2; or a displacement-to-voltage converter 26, as shown in FIG. 3. Because either of the two load lines 13z and 13z' may serve as the major load line, both load lines are equipped with the same pressure compensating means.

Referring to FIG. 1, where two flow rate measuring devices 31 and 31' are arranged in the load lines 13z and 13z', respectively, the control computer feeds a flow rate program to the proportional P/Q valve 12 in the minor load line 13z, while verifying the input values against the output signal of the adjustment position transducer 31a of the flow rate measuring device 31 in the load line 13z. The latter thereby compensates for the pressure imbalance in the minor load line 13z by overriding the output signal of the adjustment position transducer 12c of the proportional P/Q valve 12.

In the example of FIG. 2, the two load lines 13z and 13z' are equipped with pressure balancing valves 32 and 32', respectively. While the pressure balancing valve 32' in the major load line 13z' is inoperative, i.e. held open at all times, the pressure balancing valve 32 in the minor load line 13z serves to establish the same constant pressure gradient for the proportional P/Q valve 12 in the minor load line 13z z as is produced by the pump adjusting valve 20 for the proportional P/Q valve 12' in the major load line load line 13z'.

The pressure balancing valve 32 accomplishes this by reducing the pressure in the minor load line 13z upstream of the proportional P/Q valve 12 in accordance with the line pressure downstream of the proportional P/Q valve 12. The value of the pressure gradient is set by means of an adjustable biasing spring in the pressure balancing valve 32. As already stated, the operational pressure gradient is preferably 11 bar.

In the embodiment of FIG. 3, the compensation of the pressure imbalance under a flow rate program for the minor load A is accomplished by using the output of a displacement-to-voltage converter 26, which is associated with load A, to verify the flow rate setting of the proportional P/Q valve 12 in the minor load line 13z. This solution is related to the embodiment of FIG. 1, inasmuch as, in both cases, an extraneously obtained feedback signal overrides the feedback signal of the adjustment position transducer 12c of the proportional P/Q valve 12.

The hydraulic circuits of FIGS. 1 and 2 also contain two displacement-to-voltage converters 26 and 26', shown in dotted lines, which means that these control devices are optional components of the embodiments of FIGS. 1 and 2. A displacement-to-voltage converter, while somewhat increasing the complexity of the machine, offers a higher accuracy of response, as compared to the a flow measuring device, or the adjustment position transducer 12c of the proportional P/Q valve 12.

Depending upon the energy requirements and the control program of the loads to be driven, it may be advantageous to arrange in one of the two load lines a pressure balancing valve 32, as in FIG. 2, and in the other load line a flow rate measuring device 31, as in FIG. 1.

A preferred commercially available variable delivery pump 16 is adjustable over a pressure range of 250 bar, so that most combinations of two loads are drivable with one pump. Such a pump may have a maximum output capacity of 100 liter per minute. This output may be divided into any combination of flow rates in the two load lines.

A pressure relief valve 15, connecting the main supply line 13 to the fluid reservoir 19, via the pressure relief line 23 and the drain line 23a, protects the variable delivery pump 16 against overloading. A suction line 25 with a oil filter 18 leads from the fluid reservoir 19 to the input side of the variable delivery pump 16.

It is to be understood that the invention is not limited in its application to the details of construction and arrangement of parts illustrated in the accompanying drawings, since the invention is capable of other embodiments and of being practiced or carried out in various ways. It is also to be understood that the phraseology or terminology employed herein is for the purpose of description and not of limitation.

I claim the following:

1. A hydraulic control system for simultaneously driving two hydraulic loads of a production machine, particularly an injection molding machine, by means of a variable delivery pump feeding hydraulic drive fluid to said hydraulic loads through separate load lines, in accordance with independently controllable programs of flow rate and pressure, the hydraulic control system comprising in combination:
    a variable delivery pump feeding drive fluid to a main supply line, the main supply line branching into two load lines which lead to the two hydraulic loads of the production machine;
    program means operable to generate flow rate programs and pressure programs for each load line, independently of the program assigned to the other load line;
    flow-controlling valve means arranged in each load line for adjusting the flow rate in the associated load line in accordance with a flow rate program supplied by the program means;
    pressure-controlling valve means arranged in each load line for adjusting the pressure in the associated load line in accordance with a pressure program supplied by said program means;
    pressure transducing means associated with each load line for verifying the adjusted load line pressure against the pressure program supplied by the program means;
    a pump adjusting valve having a pressure feedback line with two feedback branches linking the pump adjusting valve to both load lines downstream of their associated flow-controlling valve means and pressure-controlling valve means, the pump adjusting valve responding to the pressure in the major load line, which is the line momentarily carrying a higher operating pressure, by continuously adjusting the pump output so as to maintain a constant operational pressure gradient between the main supply line and the major load line downstream of its associated flow-controlling valve means and pressure-controlling valve means;
    flip-flop valve means arranged in the junction between the feedback line and the two feedback branches for disconnecting from the feedback line the minor load line, which is the line momentarily carrying a lower operating pressure;
    means associated with each of the two load lines for compensating the pressure imbalance in the minor load line, independently of the magnitude of said operational pressure gradient.

2. A hydraulic control system as defined in claim 1, wherein
    the flow-controlling valve means and the pressure-controlled valve means of each load line are combined in the form of a proportional P/Q valve which has an adjustment position transducer for the verification of valve settings under a flow rate program.

3. A hydraulic control system as defined in claim 2, wherein
    the pressure imbalance compensation means has the form of a flow rate measuring device in each of the two load lines; and
    the flow rate measuring device in the minor load line serves for the verification of the settings of the associated proportional P/Q valve under a flow rate program, while overriding the adjustment position transducer of said proportional P/Q valve.

4. A hydraulic control system as defined in claim 2, wherein
    the pressure imbalance compensating means has the form of a pressure balancing valve in each of the two load lines; and
    the pressure balancing valve in the minor load line serves to reduce the pressure in the minor load line upstream of the associated proportional P/Q valve to a level at which said proportional P/Q valve is operating under the same operational pressure gradient as the proportional P/Q valve in the major load line.

5. A hydraulic control system as defined in claim 2, wherein
    the pressure imbalance compensating means has the form of a displacement-to-voltage converter which forms part of each of the two hydraulic loads of the production machine; and
    the displacement-to-voltage converter of the hydraulic load which is fed through the minor load line serves for the verification of the settings of the proportional P/Q valve in the minor load line under a flow rate program, while overriding the adjustment position transducer of said proportional P/Q valve.

6. A hydraulic control system as defined in claim 2, wherein
    the pressure imbalance compensating means associated with one load line is in the form of a flow rate measuring device; and
    the pressure imbalance compensating means associated with the other load line is in the form of a pressure balancing valve.

7. A hydraulic control system as defined in claim 2, wherein
    the pressure imbalance compensating means associated with one load line is in the form of a flow rate measuring device; and
    the pressure imbalance compensating means associated with the other load line is in the form of a displacement-to-voltage converter forming part of the hydraulic load which is fed through the other load line.

* * * * *